March 7, 1961
C. E. ATKINS
2,974,292
OSCILLATOR CONTROL CIRCUIT
Filed Aug. 9, 1957
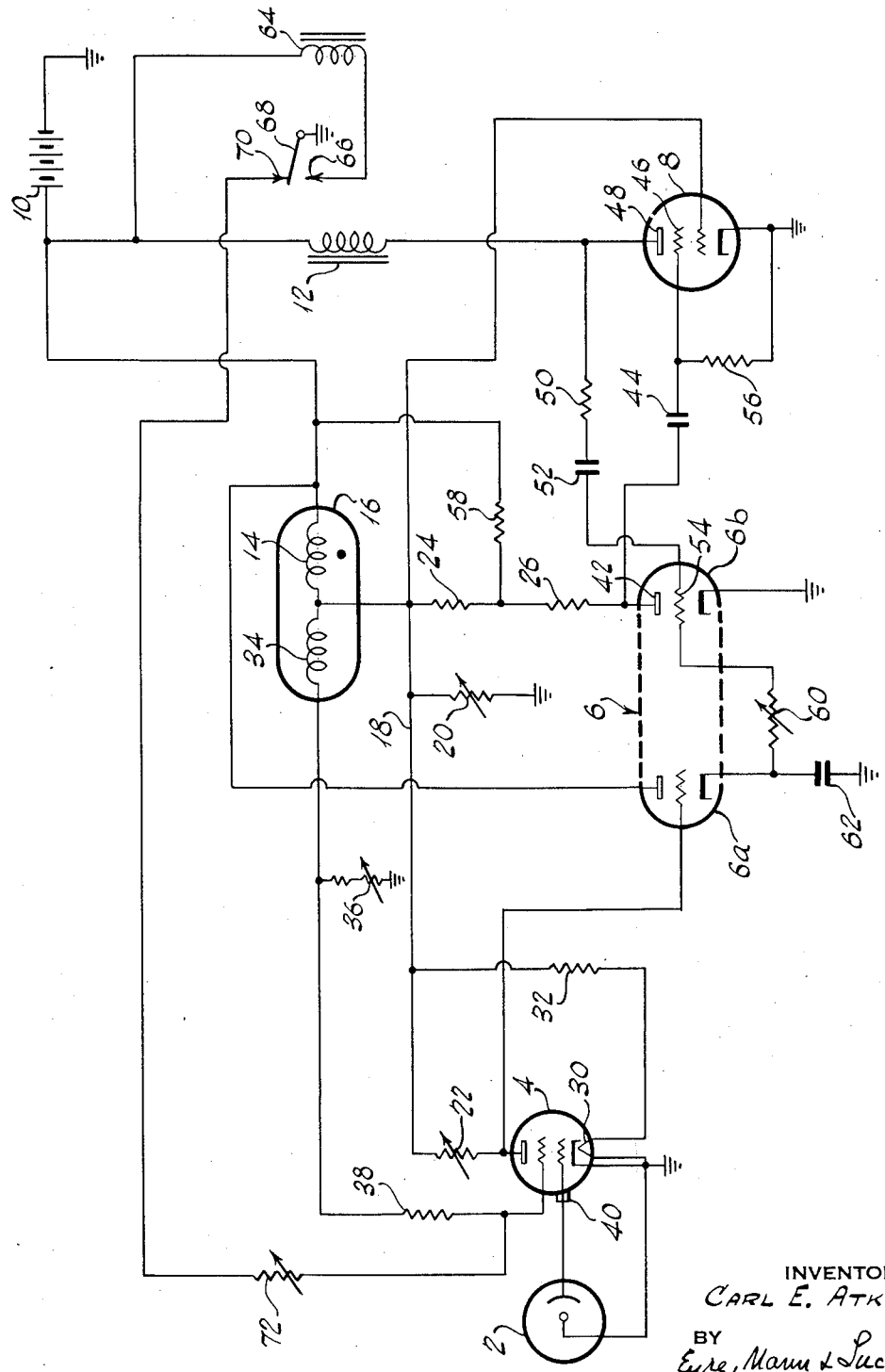
INVENTOR
CARL E. ATKINS
BY
Eyre, Mann & Lucas
ATTORNEYS

United States Patent Office 2,974,292
Patented Mar. 7, 1961

2,974,292
OSCILLATOR CONTROL CIRCUIT

Carl E. Atkins, Bloomfield, N.J., assignor to Tung-Sol Electric Inc., a corporation of Delaware Filed Aug. 9, 1957, Ser. No. 677,377

4 Claims. (Cl. 331—145)

The present invention relates to a novel low voltage oscillatory circuit suitable for use as a multivibrator and to a light responsive control circuit incorporating the new oscillatory circuit.

As the new oscillatory circuit, while of general application, is particularly adapted for use in the control of automobile headlamps in response to incidence of light, it will be described with reference to such application and particularly with reference to the type of light responsive system disclosed and claimed in my prior pending applications Serial No. 433,959 filed June 2, 1954, now Patent No. 2,842,721, Serial No. 547,508 filed November 17, 1955, now Patent No. 2,850,674 and Serial No. 548,681 filed November 23, 1955, now Patent No. 2,850,682, over which the light responsive circuit of the present invention is an improvement. Each of the circuits of the said prior applications comprises in general a photoelectric tube, preferably a diode, which when subjected to light causes increase in current through an electronic multi-element tube (called an electrometer tube), an oscillatory circuit coupled to the electrometer tube and quiescent except when light is incident on the photocathode of the photoelectric tube and a relay control tube connected to the oscillatory circuit or forming a part thereof and pulsed when the photoelectric tube is subjected to light, the relay control tube being normally conducting to hold energized in its plate circuit a sensitive relay which, upon release of its armature, closes contacts controlling the circuits of a power relay.

In application Serial No. 548,681, a novel oscillatory circuit is disclosed in which oscillation is initiated by application of negative potential to the control grid of the first of two tubes and quenched by application of positive potential to such grid. In the light responsive circuit of that application the relay control tube serves not only to control the sensitive relay but also as the second of the two tubes of the oscillatory circuit and the control grid of the first tube of the oscillatory circuit is connected directly to the anode of the electrometer tube for reception of triggering control potential therefrom. In such circuit the operating point of the electrometer tube must be so chosen that the magnitude of the potential impressed upon the grid of the first of the two tubes of the oscillatory circuit is of the proper value for initiation or quenching of oscillation. When the most efficient operating point for the electrometer tube is such that the anode potential is above the desired range for application to the control grid of the first tube of the oscillatory circuit resort must be had to potential dividers or the like with consequent reduction in sensitivity. In the circuit of the present application this difficulty is avoided by providing adjustable means for converting the anode potential of the electrometer tube to a value best suited for triggering the oscillatory circuit, such means not affecting the sensitivity of the circuit and thereby allowing the electrometer tube to be utilized at highest efficiency. Briefly, the means for converting the anode potential of the electrometer tube to that desired for application to the control grid of the first tube of the oscillatory circuit includes a triode the cathode of which is connected through an adjustable resistor to the control grid of the first tube of the oscillatory circuit and the control grid of which is connected directly to the anode of the electrometer tube. With this addition to the circuit of application Serial No. 548,681 it is possible to set the firing potential of the oscillatory circuit anywhere from a volt or two up to ten volts. The triode or triode section connected between the electrometer tube and the oscillatory circuit acts as an adjustable grid leak for the first tube or tube section of the oscillatory circuit, the conductance of the triode together with the value of the cathode resistor determining the firing point of the oscillatory circuit.

In the circuits of my said prior applications a ballast lamp is provided for regulating the voltage applied to the anodes of the tubes when the circuit is energized from an unregulated source, such as a car carried battery. Because of the thermal inertia of the hydrogen-iron lamps used for voltage stability, there may not be immediate compensation for sudden changes in the battery voltage. The potential of the screen grid of the electrometer tube is critical and hence a rapid shift in screen voltage, under some conditions, causes the system to momentarily shift to upper beam when it should be on low beam. In the circuit of the present application additional ballast means is provided, the sole function of which is to regulate the screen voltage of the electrometer tube. As such additional ballast means need supply very little current the filament thereof can be made from the finest wire that is mechanically feasible. Hence its action can be made very prompt. Furthermore, by placing both ballast means in series the full impact of the uncompensated surge of battery voltage will not be received by the ballast section regulating the screen grid voltage. Thus the compensating effects are cascaded and better regulation for the screen of the electrometer tube is obtained as well as greater freedom from the effects of undesirable voltage surges. The two ballast means of the circuit may be separate hydrogen-iron lamps connected in series but superior results are obtained when both filaments are within the same envelope. In such case, not only is there reduction in space requirements for the circuit components, an important feature in itself, but also there appears to be an interaction between the two sections which results in surprisingly good voltage regulation.

For a better understanding of the invention and of a particular circuit embodying the same reference may be had to the drawing of which the single figure is a circuit diagram representing the presently preferred embodiment of the invention.

In the drawing the light responsive circuit of the invention is shown as including a photoelectric diode 2, a tetrode 4 which serves as the electrometer tube, a double triode 6 the first section 6a of which operates as the controlled grid leak for the second section 6b and a relay control tube 8 shown as a tetrode, and which, together with section 6b of the double triode comprise the oscillatory portion of the system. Operating energy for the tubes is provided by a car carried battery 10, of the order of 11 to 15 volts. The negative terminal of battery 10 is grounded, and the positive terminal is connected directly to the anode of section 6a, to the anode of relay control tube 8 through a sensitive relay 12 and through a section 14 of a double ballast tube 16, a line 18, and adjustable resistor network 20 to ground. Line 18 in which is thus maintained a regulated voltage of say 9 volts, is connected through an adjustable dropping resistor 22 to the anode of the electrometer tube 4 and through a pair of series connected potential dropping resistors 24 and 26 to the anode of section 6b of tube 6. Line 18 also supplies the current for the cathode heater 30 of the electrometer tube, a current limiting resistor 32 being inserted between the ungrounded end of the heater and line 18. As the heaters of tubes 6 and 8 may be energized directly from the battery 10 neither these heaters nor their circuits are shown in the drawing.

To provide the voltage regulation for the screen grid of tube 4 a second section 34 of the ballast tube 16 is connected at one end to the low voltage end of section 14 and at its other end through an adjustable resistor 36 to ground, the junction of section 34 and the resistor 36 being connected through a resistor 38 to the screen grid of the electrometer tube. As heretofore described the ballast section 34 of lamp 16 may be constructed of very fine wire because the current carried by such section will be relatively small.

The electrometer tube 4 may be a 6AK6 but preferably is of the specific construction illustrated and claimed in my prior application Serial No. 547,508 filed November 17, 1955, wherein the grid cathode spacing is such as to avoid "island formation" and wherein the control grid is taken out through a separate top cap of the tube, diagrammatically indicated in the drawing by the bracket 40. The photocathode of the photoelectric tube 2 is connected directly to the control grid of tube 4 and the anode of the photoelectric tube is grounded, as is the cathode of the electrometer tube. The double triode 6 may be a 12AU7 and the relay control tube 8 may be a 12K5, preferably connected for space charge grid operation, the No. 1 grid being connected to line 18 to operate at positive potential and the No. 2 grid serving as the control grid. The cathodes of tube section 6b and of tube 8 are grounded. Tube section 6b and the relay control tube 8 are interconnected as a multivibrator to comprise the oscillatory circuit of the system. For this purpose the anode 42 of section 6b is connected through a capacitor 44 to the No. 2 grid 46 of tube 8. The anode 48 of the relay control tube 8 is connected through a resistor 50 and a capacitor 52 to the control grid 54 of section 6b. A high grid leak resistor 56 is provided for the control grid 46 of tube 8.

In order to achieve good regulation with shifting line voltage some unregulated voltage from the positive terminal of the battery 10 is applied to the anode 42 of section 6b by way of a connection, including a resistor 58, between the junction of resistors 24 and 26 and the positive terminal of the battery.

The section 6a of the double triode forming part of the effective adjustable grid leak for section 6b has its control grid connected directly to the anole of the electrometer tube and its cathode connected through an adjustable resistor 60 to the control grid 54 of section 6b. As the grid and cathode of tube section 6b thus provide the sole direct current path to the negative terminal of the source for section 6a, the potential of grid 54 of section 6b will depend upon the current through section 6a, which, in turn, depends on the potential of the grid of section 6a and upon the value of resistor 60. The cathode of section 6a may be bypassed to ground for alternating current through a capacitor 62 if desired.

The operation of the above described circuit will now be briefly described. In the absence of light the grid of the electrometer tube will be negatively charged by accumulation of electrons given off by the heated cathode of the tube. Consequently but little current will flow through that tube and the potential of the grid of section 6b will be correspondingly high. Accordingly section 6b will be conducting. Resistor 60 is so adjusted that the current through section 6b under conditions of no light, or maximum anode potential of tube 4, is that corresponding to saturation of the tube section. Relay control tube 8 will also be conducting under these circumstances and will pass a steady current through the relay 12. The circuit of a power relay 64 which is connected at one end to the positive terminal of the battery and at its other end to a back contact 66 of the grounded armature 68 of relay 12 will be open at such contact. Armature 68 will be in engagement with a front contact 70 connected through a resistor 72 to the screen grid of the electrtometer tube. No oscillation of the circuit including the tube section 6b and the tube 8 will occur under this condition of no light. If now light is incident on the photo-cathode of the photoelectric tube 2 the negative charge accumulated by the control grid of the electrometer tube will dissipate through the photoelectric tube permitting an increase in current through the electrometer tube with consequent reduction in potential of the grid of section 6a. The resultant decrease in current through section 6a reduces the potential applied to the control grid 54 of section 6b. When such reduction is sufficient to cause the current through section 6b to drop below the saturation value there will be an increase in potential at the anode 42 of section 6b which will be reflected through capacitor 44 as a positive pulse to the second or control grid 46 of the relay control tube 8. The resultant momentary increase in current through the relay control tube produces a lowering of potential at the anode 48 and the application through resistor 50 and capacitor 52 of a negative pulse to the grid 54 of section 6b. This negative pulse on the grid 54 causes a positive pulse to appear at anode 42 and at the control grid of the relay control tube which, in turn, reinforces the negative pulse at anode 48. When tube section 6b reaches cut off, the potential at anode 42 can rise no further. Consequently, when the pulse applied through capacitor 52 dissipates, section 6b will start to conduct again, the anode potential will fall and a new cycle is initiated. Thus the oscillatory circuit comprising section 6b and the relay control tube 8 will break into oscillation and continue to oscillate so long as the current through the electrometer tube 4 is sufficient to maintain the grid of section 6b at an average potential below that corresponding to current saturation and above that of cut off.

Because of the presence of the inductive winding of sensitive relay 12 in the anode circuit of tube 8 the pulses created at anode 48 will be strongly negatively peaked and of a magnitude more than sufficient to maintain the circuit in oscillation. The steady current through tube 8 which is effective to hold the relay energized will gradually decrease during oscillation of the system due partly to decrease in the average potential of the control grid of tube 8 resulting from the self-rectifying properties of the grid circuit including the high resistor 56 and to the fact that the inductive kick drives the anode potential so low during positive excursions of the grid voltage that average plate current is reduced. The resistor 50 and the inherent capacity of tube section 6b serve to reduce the magnitude of the pulses from anode 48 through capacitor 52 to control grid 54 of section 6b and at the same time to shift the phase of these pulses to insure that oscillation will be continued so long as a light signal is present.

When the relay 12 releases, the circuit of the power relay 64 is closed through the armature of relay 12 and the dimming switch (not shown) will be actuated. The circuit through adjustable resistor 72 is opened at the front contact 70 of the armature and consequently the potential of the screen grid of the electrometer tube is increased to increase the sensitivity of the circuit and to thereby insure that dimming of the lights of approaching cars will not cause return of the circuit to high beam conditions.

When light ceases to fall upon the photocathode of tube 2, the consequent reduction in current through the electrometer tube and concomitant increase in anode potential thereof raises the grid potential of section 6b sufficiently to again cause current saturation of that section and quenching of oscillation. Accordingly the current through the relay control tube returns to the steady value, relay 12 is energized to open the circuit of the power relay and to ground the end of resistor 72 in the screen grid circuit of the electrometer tube.

In order that the advantages accruing from the circuitry including section 6a of tube 6 be better understood as well as the effect on triggering potential of adjustment of resistor 60 the following explanation based on specific values of operating voltages and of the magnitudes of certain of the resistors including that of resistor 60 is given. Assume the regulated voltage of line 18 is about 9 volts and that resistors 24, 26 and 58 are respectively 2200 ohms, 15 kilohms and 2700 ohms. Then if tube 6 is a 12AU7, the current through section 6b will be that corresponding to saturation when grid 54 is at least 2.4 volts above ground. When the potential of grid 54 is reduced to —.4 section 6b becomes non-conducting. Thus, to prevent oscillation under no light conditions and yet to insure prompt triggering of the oscillatory circuit when the electrometer tube 4 starts to conduct the potential of grid 54 should be slightly above 2.0 volts under no light conditions. If resistor 22 is of the order of 1 megohm, the potential at the anode of the electrometer tube, under no light conditions may be slightly over 3.5 volts and this will also be the grid potential of section 6a. The current passed by section 6a depends both upon the magnitude of resistor 60 and the potential of the grid of that section. Under the assumed no light conditions and assigned values of the circuit elements, when resistor 60 is of about 18 kilohms, the current through section 6a and through the grid 54 of section 6b will be such that the potential of grid 54 will be slightly above 2.2 volts. When the potential at the anode of the electrometer tube drops to or below 3.5 volts due to incidence of light on the photocathode of tube 2, the triggering potential is reached and the circuit including section 6b and tube 8 will break into oscillation. If a higher or lower triggering potential is desired, because of better operating conditions for the electrometer tube 4, resistor 22 is adjusted to a lower or higher value and resistor 60 to a higher or lower value. For example, when resistor 60 is about 22 kilohms, the triggering potential is 5 volts whereas when resistor 60 is 15 kilohms the triggering potential is 3 volts.

For illustrative purposes, suitable values of the various circuit elements of the system of the drawing is here tabulated.

*Table of values*

| | |
|---|---|
| Battery 10 | 11–15 v. |
| Capacitor 44 | .05 mf. |
| Capacitor 52 | .002 mf. |
| Resistor 22 | 1 mg.—variable. |
| Resistor 24 | 2200 ohms. |
| Resistor 26 | 15K. |
| Resistor 38 | 680 ohms. |
| Resistor 50 | 22K. |
| Resistor 56 | 330K. |
| Resistor 58 | 2700 ohms. |
| Resistor 60 | 18K variable. |
| Resistor 72 | 10K variable. |

In the novel double ballast lamp 16 of the circuit, section 14 may be of relatively heavy wire say of .0041" O.D. and section 34 of relatively fine wire say of .001" O.D. Because section 14 carries the current for the circuit elements connected to line 18, the potential at the junction of sections 34 and 14 will be fairly stable. For example, if the battery voltage varies from 11 to 15 volts, the potential at the junction of the ballast tsections will vary not more than say from 8.8 to 9.3 volts. Consequently the potential at the screen grid end of ballast section 34, under such battery fluctuation, will be still more stable, varying by not more than about one part in 800, say from 8.00 to 8.01 volts. Thus the provision of the double ballast tube insures constancy of screen grid potential for the electrometer tube and protection of that grid from battery surges.

The invention has now been described with reference to the preferred embodiment thereof. It will be apparent that the invention provides a novel oscillatory circuit and control therefor embodied in a practical headlamp beam control system. Obviously the invention is not limited to use of circuit elements having the specific values assigned thereto and various changes could be made in certain parts of the system without departing from the spirit of the invention or scope of the accompanying claims.

The following is claimed:

1. An oscillatory circuit and control therefor comprising a D.C. source of operating energy, an electronic triode having an anode, a control grid and a cathode, an electronic tube having an anode, a cathode and at least one grid, means capacitatively coupled the anode of said triode with a grid of said tube and the anode of said tube with the grid of the triode, means connecting the cathodes of said triode and tube to the negative terminal of said source, a resistive impedance connected between the anode of said triode and the positive terminal of said source, said resistive impedance being of a magnitude selected with reference to the voltage of the source and to the characteristics of said triode as to cause said triode to be current saturated when the potential of the grid thereof is at or above a preselected value, an inductive impedance connected between the positive terminal of said source and the anode of said electronic tube, said triode and tube comprising together a circuit which breaks into oscillation when a potential below said preselected value is applied at the grid of said triode and in which oscillations are quenched when the grid potential of the triode is at or above said preselected value, means energized from said source and responsive to a condition to be detected for creating a control potential variable with the condition, means for converting the magnitude of the created control potential into a value suitable for control of oscillation of the oscillatory circuit, said last mentioned means comprises a second triode having a control grid, an anode connected to the positive terminal of said source, and a cathode connected through a cathode resistor to the grid of said first mentioned triode only, the grid and cathode of said first triode providing the sole direct current path to the negative terminal of the source for said second triode, and means for applying said created control potential to the control grid of said second triode.

2. The oscillatory circuit and control therefor according to claim 1 wherein said cathode resistor is adjustable to vary the triggering potential of the oscillatory circuit.

3. The oscillatory circuit and control therefor according to claim 1 wherein said means for creating a control potential comprises a tetrode having an anode connected through a dropping resistor and through a ballast resistor to the positive terminal of said source, a cathode connected to the negative terminal of said source, a screen grid connected through a second dropping resistor, through said ballast resistor and through a second ballast resistor to the positive terminal of said source and having a control grid the potential of which is determined by the condition to be detected, the anode of said tetrode being connected to the grid of said second triode, said first mentioned ballast resistor forming part of said resistive impedance connecting the anode of said first mentioned triode with the positive terminal of said source.

4. The oscillatory circuit and control therefor according to claim 3 wherein said ballast resistors are enclosed within a single gas filled envelope, said second ballast resistor being of finer wire than said first ballast resistor.

References Cited in the file of this patent

UNITED STATES PATENTS

| | | |
|---|---|---|
| 669,594 | Potter | Mar. 12, 1901 |
| 1,110,602 | Thomas | Sept. 15, 1914 |
| 1,852,893 | Mulder | Apr. 5, 1932 |
| 2,465,352 | Chatterjea et al. | Mar. 29, 1949 |
| 2,476,389 | Schmidt | July 19, 1949 |
| 2,540,539 | Moore | Feb. 6, 1951 |
| 2,598,516 | Dickinson | May 27, 1952 |
| 2,691,129 | Hall | Oct. 5, 1954 |
| 2,718,612 | Willis | Sept. 20, 1955 |
| 2,730,629 | Atkins | Jan. 10, 1956 |
| 2,829,307 | Miller et al. | Apr. 1, 1958 |
| 2,832,914 | Matkins et al. | Apr. 29, 1958 |